June 18, 1957  D. C. McDONALD  2,796,468
DIRECT CURRENT AMPLIFIER
Filed Nov. 12, 1952  2 Sheets-Sheet 1

INVENTOR.
Donald C. McDonald
BY
Hill, Sherman, Meroni, Gross & Simpson
Attys.

June 18, 1957  D. C. McDONALD  2,796,468
DIRECT CURRENT AMPLIFIER
Filed Nov. 12, 1952  2 Sheets-Sheet 2

INVENTOR.
Donald C. McDonald.
BY
Thiess, Olson, Mecklenburger, von Holst & Coltman.
ATTYS.

United States Patent Office 2,796,468
Patented June 18, 1957

2,796,468
DIRECT CURRENT AMPLIFIER

Donald C. McDonald, Skokie, Ill., assignor to Cook Electric Company, Chicago, Ill., a corporation of Illinois Application November 12, 1952, Serial No. 319,897

8 Claims. (Cl. 179—171)

This invention relates to electron tube apparatus and more particularly to electron tube apparatus for amplifying electrical signals.

It is a particular object of this invention to provide improved apparatus for amplifying electrical signals. In amplifiers heretofore known, a signal, generally of varying voltage, is applied to an input terminal, and through a series of vacuum tubes the applied signal is increased in magnitude to a degree which will render it useful for the purpose intended. To accomplish this, a source of direct current voltage is made available to the various electron tube stages, and by varying the current drawn from this source of direct current voltage, a varying output is created. In such apparatus the current drawn from the direct current voltage source or power supply varies in accordance with the signal applied to the amplifying apparatus, and, as a result of the internal impedance of such power supplies, the varying current drawn from the supply tends to vary the voltage available at the output correspondingly. While it is possible to build power supplies which will automatically compensate for these voltage variations due to power supply loading, to provide such regulated supplies capable of handling the power requirements of modern electronic apparatus is costly, complicated, and creates cumbersome, heavy apparatus. The latter characteristic is especially undesirable in aircraft operations or in any operation where space and weight are important design factors. Furthermore, if it is desired to operate more than one amplifying circuit from a given power supply, it is necessary that said power supply be well regulated to produce a constant voltage. In the absence of good regulation in a power supply adapted to drive multiple amplifiers, voltage variations resulting from the signal applied to one amplifier are reflected into the other apparatus connected to the common power supply and cause undesirable fluctuations in the outputs of all of the associated equipment.

While in amplifiers designed for handling alternating current signals these fluctuations may be small enough to be ignored or inconsequential, in apparatus designed to amplify direct current as well as alternating current signals, fluctuations in power supply voltage become highly detrimental. Alternating current amplifiers generally have successive stages coupled together by a resistive-capacitive network or by a transformer, and thus steady state changes in the supply voltage, though affecting the output of any given stage slightly, will not be amplified through successive stages. In amplifiers designed for direct current signals, on the contrary, the output of each stage must be directly coupled to the input of the next successive stage, and thus any changes in the power supply voltage, though small, will be amplified through successive stages. In a direct coupled amplifier, each successive stage amplifies any small voltage fluctuations, and in a multistage amplifier, small power supply voltage fluctuations will appear as changes in grid bias to the succeeding stage and may be sufficient to appear at the output as signals of the same order of magnitude as the intelligence being amplified. Therefore, it is a further object of this invention to provide improved electron tube apparatus which will require a fixed current from a source of direct current voltage.

It is a further object of this invention to provide amplifier apparatus which can be utilized with a simpler, lighter, and less costly power supply than heretofore known.

It is still another object of this invention to provide direct coupled amplifier apparatus which will have substantially no drift characteristics whereby a given voltage datum can be maintained.

It is an additional object of this invention to provide amplifier apparatus having the stability and consistency necessary for data reproducing operations which will require no greater power than the conventional amplifiers heretofore known.

It is a further object of this invention to provide improved amplifier apparatus having a grounded output and capable of use in combination with a plurality of similar amplifiers without creating errors due to loading of a common power supply.

Additional objects of this invention will become manifest from a consideration of this description, the accompanying drawings, and the appended claims.

In various data recording operations a multichanneled record is made of data, such as meteorological or navigational information, which is preserved in various manners for future reference and utilization. One method of recording such data is by utilizing a magnetic tape record and a plurality of recording heads adapted to record such information as altitude, temperature, humidity, etc., in adjacent channels on such a tape. In order to utilize and correlate this data into useful information, it is necessary to play back the magnetic records and to amplify the signals present on the magnetic tape to a magnitude that may be utilized to drive either photographic or direct pen recorders to make a permanent visible record. As many as twelve parallel channels are utilized on a single magnetic tape, and this necessitates the use of twelve amplifiers and recorders. It is desirable in playing back such data to provide a single power supply to energize all twelve recorders, and as the data present on the magnetic tape is often of a low frequency, it is desirable that the playback amplifiers be directly coupled and exhibit a high degree of stability. It was found that to utilize the customary amplifier created gross errors in the recorded data which resulted from variations in power supply voltage coeresponding to the signal applied to one or more of the amplifying circuits. To overcome these faults, an apparatus is here described which will exhibit a constant impedance and, consequently, require a constant current from a fixed voltage power supply irrespective of the signal applied to the amplifier input. While this will result in a greater power demand on the supply when the amplifier is in the quiescent or zero signal state, the maximum power required from the constant load amplifier for a given maximum signal will be identical with that required of amplifiers heretofore known. As will be described subsequently, the use of constant load D. C. amplifiers makes possible the use of a much simpler and less expensive power supply than could be utilized heretofore.

One form which this apparatus may assume is a three-stage amplifier in which the first stage incorporates two vacuum tubes having a common cathode resistor. The amplifier input is applied to the grid of one of these vacuum tubes, and the grid of the second tube is connected to a fixed potential or ground. By providing such an arrangement of tubes, any tendency to drift due to changes in tube characteristics or changes in filament temperature or the like is effectively canceled, as will be explained in greater detail subsequently. This first amplifier stage acts as an inverter and will produce at its outputs two varying voltages exhibiting equal but opposite voltage fluctuations. These outputs will be applied to the grids of a second balanced amplifier stage consisting of two triodes and having a common cathode resistor. Again, drift due to tube aging or changes in filament temperature is effectively eliminated by providing a balanced stage in which only the difference in conduction is ultimately determinative of the amplifier output. As a result of the inverter and balanced amplifier in which the two signals 180° out of phase are always amplified, irrespective of the applied signal at the input of the amplifier, the total current drawn by these two stages is constant. The outputs of the second balanced amplifier stages are applied to the grids of two power amplifying tubes connected in cathode follower circuits. Connected to the cathode of one of these power amplifiers is a resistance which constitutes an equivalent or dummy load, and connected to the cathode of the second power amplifier is a terminal to which a photographic or pen-type recorder movement is connected. The equivalent load and recorder movement will then have a common terminal which may or may not be connected to ground. Thus, any variations in the current in the recording system connected to the output of the one power amplifier will be effectively canceled by equal and opposite current variations in the dummy load which is connected to the other power amplifier. The total current thus drawn by this three-stage amplifier will remain constant for all amplitudes of signal input, and a simple power supply utilizing only voltage regulator tubes to correct for line voltage fluctuations may be utilized.

For a more complete understanding of the invention, reference should now be made to the accompanying drawings, wherein.

Figure 1:
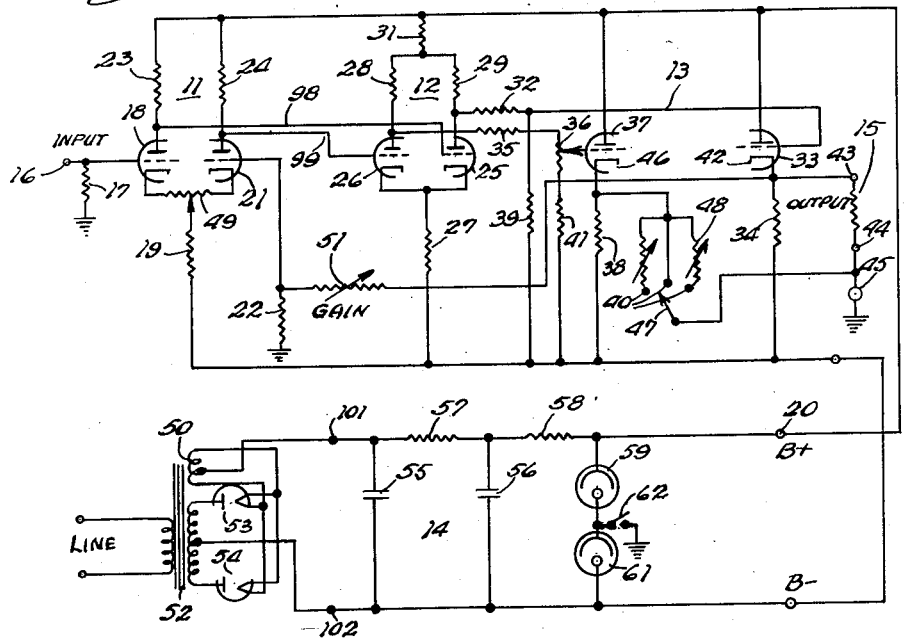
Figure 1 illustrates a circuit incorporating this invention and having a grounded output.

Referring now to the drawings, and more particularly to Fig. 1, an amplifier 10 is provided having three balanced stages: an input inverter stage 11, a balanced amplifier stage 12, and a power output stage 13. These are energized from a common power supply 14 to ultimately drive an output 15, here diagrammatically shown as a resistor but in practice actually consisting of a moving coil on an oscillograph or pen-type recorder.

A signal such as a series of pulses from a magnetic tape is applied at the input terminal 16 to appear as a voltage across the resistor 17 and on the grid of the tube 18. If it is assumed, as an example, that this applied signal is a positive voltage, an increase in current through the tube 18 will normally result. This increase in current will produce an increased positive voltage across the cathode resistor 19 which is common to the cathodes of the tubes 18 and 21. The control grid of the tube 21 is connected through an appropriate resistor 22 to ground, and thus any increase in the bias voltage present across the cathode resistor 19 will appear as a negative voltage on the control grid of the tube 21 and will thus reduce the current flowing in that tube. The tubes 18 and 21 have identical plate resistors 23 and 24 connected from their respective anodes to the positive terminal 20 of the power supply 14. For the positive input signal thus far described, a negative voltage will be produced at the anode of the tube 18 and an equal but opposite positive voltage will be produced at the anode of the tube 21. It will thus be clear that the sum of the currents flowing in the two tubes will always equal a constant. The purpose of the potentiometer 49 will be explained subsequently. The anode voltage of the tube 18 is then applied to the tube 25 of the second amplifier stage through conductor 98, and the anode voltage of tube 21 is applied to the grid of a corresponding tube 26 of the second amplifier stage through conductor 99. Again, tubes 25 and 26 have a common cathode resistor 27 and have equal plate resistors 28 and 29 here connected to a common plate resistor 31 which is in turn connected to the positive terminal 20 of the power supply 14. Utilization of a second balanced amplifying stage having a common cathode resistor results in no degenerative effects as the two grid signals are of opposite polarity and thus changes in current are equal and opposite. The use of such a balanced stage does, however, increase the stability gain and balance of the entire system. All effects due to tube drift and temperature change are compensated for as the differential voltage between the anodes of tubes 25 and 26 are unaffected thereby. Again, if a positive input pulse is assumed at the terminal 16, a negative signal is applied to the control grid of the tube 25 which produces a positive voltage at the anode, and, conversely, a positive signal has been applied to the control grid of the tube 26 which produces a negative signal at its anode. These two signals, 180° out of phase are now applied to the control grids of two electron tubes 33 and 37 which compose the power output stage 13. The anode voltage of the tube 25 is applied through resistor 32 to the control grid of the tube 33. The tube 33 is connected in a cathode follower circuit in which the resistor 34 comprises the cathode load, and the plate of tube 33 is connected directly to the positive terminal 20 of the power supply 14. The anode voltage of the tube 26 is applied through resistor 35 and a portion of potentiometer 36 to the control grid of a tube 37 identical with tube 33, which comprises the other half of the balanced power output stage. Tube 37 is also connected in a cathode follower circuit having a cathode resistor 38 connected to the negative terminal 30 and having its anode connected directly to the positive terminal 20 of the power supply 14. Resistor 39 provides a return from resistor 32 to the negative terminal 30 of power supply 14, and resistor 41 connected in series with resistor 35 and potentiometer 36 provides a return from the anode of the tube 26 to the negative terminal of power supply 14. Resistors 32 and 39 thereby serve as a voltage divider to apply a predetermined portion of the anode voltage of tube 25 to the control grid of tube 33 and the resistors 35 and 41 and potentiometer 36 provide an adjustable voltage divider to apply a determinable portion of the anode voltage of tube 26 to the control grid of tube 37. The purpose and manner of adjusting potentiometer 36 will be explained below.

Connected to the cathode 42 of the tube 33 is an output terminal 43, and a corresponding output terminal 44 is connected to a meter jack 45 which may or may not be shorted to ground. The output, schematically shown here as an impedance 15, is normally connected between the terminals 43 and 44. Connected between the cathode 46 of the tube 37 and the meter jack 45 is a selector switch 47 adapted to engage a plurality of contacts 40, each of which is connected to the cathode 46. The connection between contacts 40 and cathode 46 may include a resistance or impedance of predetermined magnitude, for example, resistors 48 shown in Figs. 1 and 2. The plurality of resistors 48 are adjustable and chosen to approximately match the anticipated values of the output load 15, whereby for any load connected at the output a substantially equal dummy resistor 48 can be inserted in the circuit of tube 37 by adjustment of the variable resistors 48 and selection of the appropriate tap by the switch 47. Thus again assuming a positive input pulse at terminal 16, the signal applied to the control grid of tube 33 will be positive, and the signal applied to the control grid of tube 37 will be negative and of substantially the same magnitude. This will in turn result in equal and opposite fluctuations in the voltages present at the cathode 42 and at the cathode 46. Such opposite variations in voltage between these cathodes will result in an equal and opposite current through the load 15 and the variable dummy load 48. If the dummy load 48 is chosen precisely equal to the load 15, the voltage present at the meter jack 45 will not vary and, consequently, the net current to ground will be constant.

By proper adjustment of potentiometers 49 and 36, and selector switch 47 and resistors 48, it is possible to balance the entire amplifier circuit so that in the event that the output terminal 44 is grounded, there will be zero current flowing to ground at that point, or if ungrounded, the potential will not drift from a predetermined value. There are only three operations which must be performed in balancing the above-described amplifier for constant current operation. Potentiometer 49 is first adjusted to bring the output terminal 43 to ground potential. This can be determined by the use of a voltmeter in a known manner. Potentiometer 36 is subsequently adjusted, which adjusts the grid bias on tube 37 whereby the cathode of said tube is set at ground potential. Both of the above adjustments are performed without any signal impressed upon the input terminal 16. Switch 47 and adjustable resistors 48 are then set equal to the load impedance 15 by applying a signal to the terminal 16 and inserting a milliammeter in the jack 45 and adjusting resistor 48 to produce substantially zero current through the meter. A negative feedback network is provided from the cathode 42 of the tube 33 to the control grid of the tube 21 and includes a rheostat 51 and grounded resistor 22. This feedback network serves as a gain control for the entire apparatus and also improves the stability and fidelity of the amplifier as is understood in the art.

A very simple power supply 14 is provided for this apparatus, as there is no requirement for a high degree of regulation for varying current loads. The power supply consists of a power transformer 52 having a center-tapped high voltage secondary and a filament winding. The secondary is connected to a pair of diodes 53, 54 in the customary manner to form a full wave rectifier to provide a pulsating D. C. voltage between the positive terminal 101 and the negative terminal 102. A filter consisting of condensers 55 and 56 and series resistors 57 and 58 is provided, which, for constant current conditions, reduces the line frequency hum to a negligible magnitude. Two series connected voltage regulating tubes 59, 61 are connected across the output terminals of the filter to compensate for any fluctuations in the line voltage applied to the power transformer 52. The common connection between these VR tubes is connected to a ground terminal through a single pole switch 62. If the switch 47 in the amplifying circuit is connected to its center position in which there is a direct connection from the output terminal 44 to the cathode 46 of the tube 37, the switch 62 is set to the open position to prevent excessive currents flowing to the center tap of the two voltage-regulating tubes when a signal is applied to input terminal 16. Thus, a grounded output is still provided, but the power supply will be ungrounded. Operating the above-described circuit with the cathode 46 of tube 37 grounded and the switch 62 open renders performance which is in every respect equal to that of the circuit incorporating a dummy load in the circuit of cathode 46. Whenever a dummy resistor 48 is inserted by the appropriate setting of the switch 47, the switch 62 may remain closed as substantially no current will then flow to the ground terminal which is connected to the center tap of the voltage-regulating tubes.

Thus, an amplifier is provided in which each stage draws a substantially constant current irrespective of the signal applied to that stage, and at each stage, fluctuations which might occur due to aging of the tubes and changes in circuit components are effectively canceled out by the use of balanced circuits. Therefore, a simple power supply may be utilized which will merely compensate for line voltage fluctuations.

Figure 5:
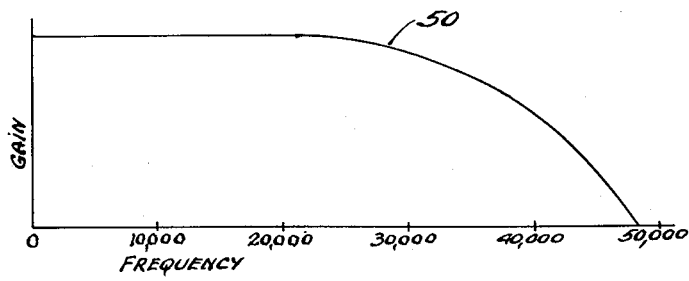
Fig. 5 is a frequency response curve for the circuit of Fig. 1.

The frequency response characteristics of the circuit of Fig. 1 are illustrated in Fig. 5. From Fig. 5 it can be seen that the response of the amplifier 10, shown by curve 50, is substantially flat from zero frequency or direct current to approximately 30,000 C. P. S. At that frequency, the gain of the amplifier begins to diminish as a result of the interelectrode capacitance and leakage within the various circuit elements. However, this frequency range is more than adequate for the requirements of data interpreting apparatus and other applications of D. C. and audio frequency amplifiers.

Figure 2:
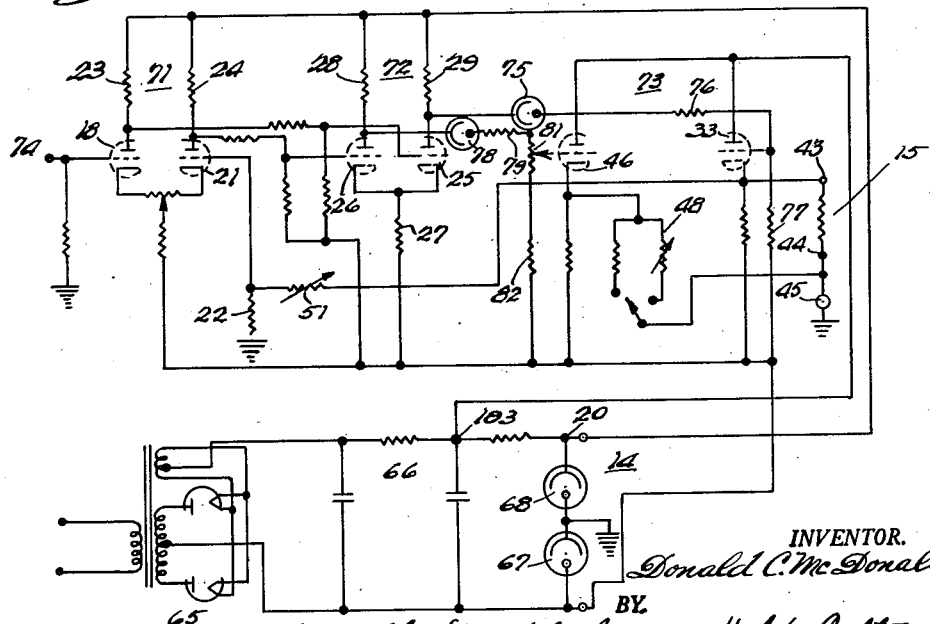
Fig. 2 shows a second embodiment of this invention capable of larger power outputs and greater gain.

The embodiment of Fig. 2 utilizes a power supply 14 substantially the same as that utilized in the embodiment above described. It uses a full wave rectifier 65 and filter 66. A pair of voltage-regulating tubes 67 and 68 are connected across the output terminal, and the center tap of the two voltage-regulating tubes is connected to a grounded terminal. This power supply differs from that above described only in the choice of voltage-regulating tubes and the manner in which the voltages for the various amplifier stages are taken. As the amplifier of Fig. 2 is adapted for higher power capabilities and larger gains, both tubes 67 and 68 would preferably be of the type VR–150, whereas in the lower power supply of Fig. 1, the voltage-regulating tube 61 was preferably of the type VR–105. The high voltage for operating the output stage of this amplifier is taken at terminal 103 to provide a somewhat higher plate voltage for this stage. Though some stability is sacrificed and line frequency hum is slightly increased, the effects are not detrimental to satisfactory operation. The amplifier 69 of Fig. 2 again consists of a balanced input stage 71, a second balanced amplifier stage 72, and a power output stage 73. An input terminal 74 is provided which energizes one grid of the first balanced amplifier stage, and as the first stage serves also as an inverter as described above, two signals of substantially equal magnitude but opposite polarity are available at the anodes of the tubes 18 and 21. These equal and opposite signals are applied to the control grids of tubes 25 and 26 as described above to produce substantially amplified signals in 180° phase relation at the anodes of these tubes. The tubes 25 and 26 are connected in a balanced amplifier circuit having a common cathode resistor 27, and each of the tubes 18, 21, 25 and 26 is connected through an appropriate plate resistor to the positive terminal 20 of the power supply 14. Connected to the anode of the tube 25 is a gaseous tube 75 such as a neon tube which is in series with a resistor 76 and a second resistor 77 which is in turn connected to the negative terminal of the power supply 14. The common connection between the resistors 76 and 77 is also connected to the control grid of the tube 33 in the power amplifier stage 73. By this circuit arrangement, a predetermined and fixed voltage drop will appear across the gaseous tube 75, and this voltage drop will not be substantially changed irrespective of the signal applied to the input terminal 74. As will be understood, this results in a substantially increased effective signal variation available on the control grid of the tube 33. In the normal resistance type voltage divider, the signal is reduced in proportion to the voltage reduction, while herein the signal is not proportionately reduced. The presence of the gaseous tube 75 is the equivalent of the insertion of a fixed D. C. potential between the resistor 76 and the anode of the tube 25. In a like manner, a gaseous tube 78 is connected between the anode of the tube 26 and a voltage dividing resistor 79. The resistor 79 is in turn connected to a potentiometer 81 and a resistor 82, the resistor 82 being connected to the negative terminal of the power supply 14. Thus, the voltage applied to the control grid of tube 46 is also reduced by a magnitude equal to the voltage drop across the ionized gaseous tube 78, and thus in effect incremental changes in the signal voltage of the amplifier will not be attenuated or reduced by the drop across the gaseous tubes. In this circuit, as in the circuit of Fig. 1, an impedance 15 is illustrated as the output load, but it is clear that any desired load might be applied between the terminals 43 and 44. By properly selecting the magnitude of the resistor 48 connected in the circuit of tube 37, effective cancellation of all of the load current is accomplished whereby substantially no current flows to the ground terminal through the meter jack 45. This is extremely desirable as any current flowing through the meter jack 45 also must flow through either the voltage-regulating tube 67 or 68. Over a limited current range, the voltage across such VR tubes remains relatively constant, but in multichannel apparatus this range might be readily exceeded. Again, the amplifier gain is controlled by a feedback network from the cathode of tube 33 through the adjustable resistor 51 to the control grid of tube 21. The cathode voltage of the tube 33 is thus applied across the resistor 22, and this will alter the control grid voltage of tube 21 of the input stage.

The triodes 33 and 37 in the power amplifying stage must have high power capacities, but may have relatively low gain characteristics. One typical tube found especially applicable here is the tube type 6BL7, which is capable of handling the power requirements of this circuit and has appropriate gain. The entire three-stage amplifier is designed to have a maximum gain of about 15.

Figure 3:
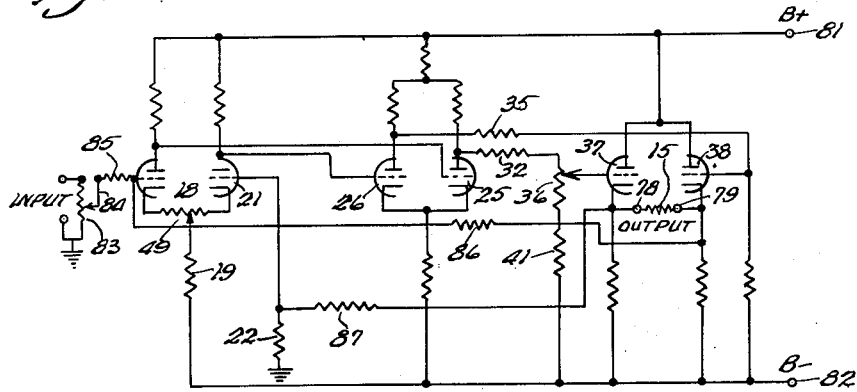
Fig. 3 illustrates a third embodiment of this invention utilizing an ungrounded output.

The circuit of Fig. 3 is also a three-stage direct-coupled amplifier in which each stage is of a balanced design whereby the load which is exhibited to an appropriate power supply will remain constant. In this circuit, however, neither of the output terminals 78 or 79 is connected to a reference potential or ground. Therefore, although this circuit is somewhat simpler, it will be unsatisfactory in any application in which it is necessary that the circuit energize a grounded output. Either of the power supplies taught in Fig. 1 or Fig. 2 might be connected to the terminals 81 and 82 of Fig. 3 to provide the customary positive and negative power supply. In this embodiment, a gain control is provided at the input by the potentiometer 83. By adjusting the potentiometer wiper 84 at any desired position, the voltage amplitudes available at the output terminals 78 and 79 may be determined. The input voltage is then applied through resistor 85 to the control grid of tube 18 which is identical with the input tube of Figs. 1 and 2. Tube 18 is connected in a balanced amplifier circuit which includes a second tube 21, a balancing potentiometer 49, and a common cathode resistor 19. The operation of this circuit has been adequately described above, and it is clear that the outputs available at the anodes of the tubes 18 and 21 will be substantially equal and of opposite polarity. These signals are then applied to the control grids of the tubes 25 and 26 of the next successive stage, where they are again amplified and made available at the anodes of tubes 25 and 26 as voltages of increased magnitude, still maintaining the 180° difference in polarity. These anode voltages are then applied through resistors 32 and 35 to respective control grids of the power amplifying tubes 33 and 37 which are connected in cathode follower circuits. In this embodiment, however, the output load 15 is connected directly between the cathodes of the power amplifying tubes 33 and 37, and there is no reference available to a ground or fixed potential. Thus, in operation, varying input signals cause substantially equal and opposite variations in the potential of both terminals 78 and 79 which is often undesirable where the apparatus is being handled, as all parts of the apparatus must be isolated from ground. The resistor 32 is connected from the anode of tube 25 to a potentiometer 36, resistor 41, and the negative power supply terminal 82. These resistors and potentiometer serve as a voltage divider to provide a control for the cathode follower stage which includes the triode 37 to determine the voltage present between the terminals 78 and 79 for a zero input. In this embodiment, two feedback networks are provided to improve frequency response and amplifier stability. A feedback resistor 86 is connected from the cathode of the tube 33 to the control grid of the tube 18, and as the cathode voltage will normally be out of phase with the input voltage, a negative feedback voltage is applied to the control grid which will reduce third harmonic distortion, as is well known in the art. In a like manner, a feedback network consisting of resistors 87 and 22 is provided from the cathode of the tube 46 to the control grid of the input tube 21, and again, this is a negative feedback voltage which will reduce harmonic distortion and improve the fidelity of the amplifier, as is well understood.

Figure 4:
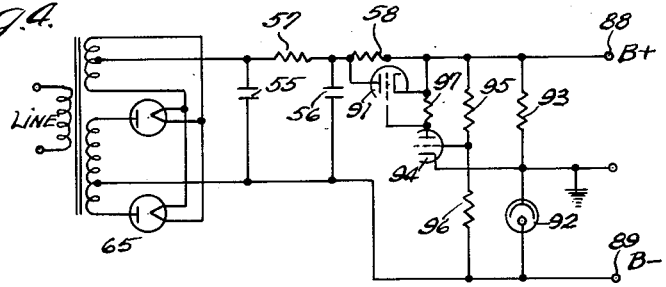
Fig. 4 shows an alternate power supply which may be utilized where a large number of amplifiers are simultaneously employed.

The power supply shown in Fig. 4 may be substituted for the power supply in any one of the above-described embodiments. The power supply of Fig. 4 is adapted for use wherever variations may occur in the load current drawn by one or more of the amplifier circuits above described. It will be found, in utilizing this apparatus, that a small difference between the output load impedance 15 and the impedance of the dummy resistor 48 will result in small currents flowing to the center tap of the VR tubes 67 and 68 or 59 and 61 of the power supply 14. If a large number of amplifiers are utilized in one operation and are energized from a common power supply, the total current will become sufficient to destroy the regulation and accuracy of the apparatus. To overcome this possible defect, the power supply of Fig. 4 is provided with dynamic compensation for variations in the load current drawn. This power supply consists of a full wave rectifier 65 and a filter consisting of condensers 55 and 56 and a series resistor 57. A second series resistor 58 serving as a filter passes the load current to the power supply terminals 88 and 89, and in parallel with resistor 58 is a power-amplifying triode 91. A series circuit comprising a VR tube 92 and resistor 93 is connected across output terminals 88, 89. Connected in parallel with the resistor 93 is voltage-amplifying triode 94 which has its grid connected to the center tap of a voltage divider consisting of resistors 95 and 96. The triode 94 has a plate resistor 97 which is connected to the positive terminal 88 of the power supply.

If for any reason such as line voltage fluctuations or extreme amplifier loading the voltage present across the terminals 88, 89 tends to decrease, it is clear that the voltage present between the resistors 95 and 96 will also tend to decrease. This voltage is in effect the control voltage of the voltage amplifier 94. The cathode voltage present on the voltage amplifier 94, however, will remain substantially constant, as it is determined by the voltage-regulating tube 92. Thus, a decrease in terminal voltage of the power supply will cause an effective negative grid bias on the voltage amplifier 94 which will decrease the current flowing in the plate resistor 97. This decrease in current will produce a decreased negative bias on the power amplifier 91 which is in parallel with the resistor 58 and will thus appear to the output terminals as a decrease in the internal impedance of the power supply. This will cause a rise in the terminal voltage in the power supply and will completely compensate for the line or loading effects which will cause the initial voltage drop.

While in the description the circuits have been especially applied to the amplification of signals available from magnetic tapes which are subsequently to control either photographic, oscillographic, or mechanical pen recorders, it should be clear that the applications of the circuit herein disclosed are many, limited only by the skill of those who work in the varied fields of telemetering, data recording and reproducing, and intelligence transmission. The circuits herein disclosed have extremely desirable frequency characteristics, are highly stable, and introduce little distortion into the amplified signal. The drift of the above described amplifier is about one millivolt referred to the input grid. Over the normal operating range the apparatus is linear to within ±½ percent. By the appropriate choice of circuit components, the amplifier of Fig. 1 maintains this linearity for the operating range of ±10 milliamperes when energizing a load of from 50 to 1,000 ohms. By appropriate choice of the cathode resistors 34 and 38, the amplifier will operate satisfactorily over the range of output voltage of ±50 volts when energizing load impedance above 50,000 ohms.

If 12 or more such amplifiers are driven from a common power supply, each having an output range of ±50 milliamperes, it should be clear that the circuits heretofore utilized would require large cumbersome highly regulated power supplies while the apparatus herein taught may utilize a simple power supply which employs only VR tubes for regulation. Also, as pointed out above, the load presented by these amplifiers to an associated power supply is constant for all values of input signals and thus an extremely simple source of voltage is required. Voltage regulation is required in the associated power supply only to compensate for fluctuations in the line voltage and not for any fluctuations in current drain by the energized apparatus. This makes it possible to use multiple amplifiers drawing power from a single source of voltage without fear of feedback effects from the various apparatus.

Without further elaboration, the foregoing will so fully explain the gist of my invention that others may, by applying curent knowledge, readily adapt the same for use under varying conditions of service, without eliminating certain features, which may properly be said to constitute the essential items of novelty involved, which items are intended to be defined and secured to me by the following claims.

I claim:

1. Electron tube apparatus for supplying power in accordance with an input signal and adapted to use a substantially constant current from a D. C. supply comprising a pair of electron tubes having at least an anode, a cathode and a control grid, a pair of cathode resistors, each of which is connected in series with one of said tubes in a cathode follower circuit across such a supply, energizing means connected to the control grid of each of said electron tubes for varying the voltages on said grids in opposite directions and in substantially equal amounts from a predetermined center value corresponding to changes in such an input signal, a load impedance connected to the cathode of one of said electron tubes, and impedance means connected to the cathode of the second one of said electron tubes and having a value substantially equal to the impedance of said load, said load impedance and impedance means being connected in series whereby the common connection therebetween will be at a substantially fixed potential, and voltage-adjusting means in one of said energizing means to determine said center value and said fixed potential.

2. Electron tube apparatus for supplying power in accordance with an input signal and adapted to use a substantially constant current from a D. C. supply comprising a pair of electron tubes having at least an anode, a cathode and a control grid, a pair of cathode resistors, each of which is connected in series with one of said tubes in a cathode follower circuit across such a supply, energizing means connected to the control grid of each of said electron tubes for varying the voltages on said grids in opposite directions and in substantially equal amounts from a predetermined center value corresponding to changes in such an input signal, a load impedance connected to the cathode of one of said electron tubes, and impedance means connected to the cathode of the second one of said electron tubes and having a value substantially equal to the impedance of said load, said load impedance and impedance means being connected in series whereby the common connection therebetween will be at a substantially fixed potential voltage-adjusting means in one of said energizing means to adjust said center value so that said fixed potential will be substantially at ground potential, and second voltage-adjusting means at the grid of said one of said electron tubes to determine the output of said second one of the electron tubes so that for the maximum variation of voltage on said grid from said center value there will be substantially no current flowing in said impedance means.

3. Electron tube aparatus for supplying power in accordance with an input signal and adapted to use a substantially constant current from a D. C. supply comprising a pair of electron tubes having at least an anode, a cathode and a control grid, a pair of cathode resistors, each of which is connected in series with one of said tubes in a cathode follower circuit across such a supply, energizing means connected to the control grid of each of said electron tubes for varying the voltages on said grids in opposite directions and in substantially equal amounts from a predetermined center value corresponding to changes in such an input signal, said means including a differential amplifier having two electron tubes connected in parallel and a common cathode resistor to produce voltages at their anodes of substantially equal but opposite variations corresponding to variations in a voltage applied to the grid of one of said two electron tubes, a load impedance connected to the cathode of one of said electron tubes, and impedance means connected to the cathode of the second one of said electron tubes and having a value substantially equal to the impedance of said load, said load impedance and impedance means being connected in series whereby the common connection therebetween will be at a substantially fixed potential, voltage-adjusting means in one of said energizing means to adjust said center value so that said fixed potential will be substantially at ground potential, and second voltage-adjusting means at the grid of said one of said electron tubes to determine the output of said second one of the electron tubes so that for the maximum variation of voltage on said grid from said center value there will be substantially no current flowing in said impedance means.

4. Electron tube apparatus for supplying power in accordance with an input signal and adapted to use a substantially constant current from a D. C. supply comprising a pair of electron tubes having at least an anode, a cathode and a control grid, a pair of cathode resistors each of which is connected in series with one of said tubes in a cathode follower circuit across such a supply, energizing means connected to the control grid of each of said electron tubes for varying the voltages on said grids in opposite directions and in subsantially equal amounts from a predetermined center value corresponding to changes in such an input signal, said means including a first differential amplifier having two electron tubes connected in parallel and a common cathode resistor to produce voltages at their anodes of substantially equal but opposite variations corresponding to variations in a voltage applied to the grid of one of said two electron tubes and a second differential amplifier having two electron tubes connected in parallel and having a common cathode resistor, the control grids of said two electron tubes being energized directly from the anodes of said two electron tubes of the first differential amplifier, a load impedance connected to the cathode of one of· said electron tubes, and impedance means connected to the cathode of a second one of said pair of electron tubes and having a value substantially equal to the impedance of said load, said load impedance and impedance means being connected in series whereby the common connection therebetween will be at a substantially fixed potential, voltage-adjusting means in one of said energizing means to adjust said center value so that said fixed potential will be substantially at ground potential, and second voltage-adjusting means at the grid of said second one of said electron tubes to determine the output of said one of the electron tubes so that for the maximum variation of voltage on said grid from said center value there will be substantially no current flowing in said impedance.

5. Electron tube apparatus for supplying power in accordance with an input signal and adapted to use a substantially constant current from a D. C. supply, said apparatus comprising a pair of electron tubes having at least an anode, a cathode and a control grid, a pair of cathode resistors, each of which is connected in series with one of said tubes in a cathode follower circuit across such a supply, energizing means for each of said electron tubes for varying the voltages on said control grids in opposite directions and in substantially equal amounts from a predetermined center value corresponding to changes in such an input signal, network means for connecting the output of said energizing means to said control grids, said network means including a low impedance fixed voltage means for altering the voltages applied to said control grids by a predetermined amount serially connected between said energizing means and said control grids, a load impedance connected to the cathode of one of said electron tubes, and impedance means substantially equal to such load connected to the cathode of the second one of said electron tubes, said load impedance and impedance means being connected in series whereby the common connection therebetween will be at a substantially fixed potential.

6. Electron tube apparatus for supplying power in accordance with an input signal and adapted to use a substantially constant current from a D. C. supply, said apparatus comprising a pair of electron tubes having at least an anode, a cathode and a control grid, a pair of cathode resistors, each of which is connected in series with one of said tubes in a cathode follower circuit across such a supply, energizing means for each of said electron tubes for varying the voltages on said control grids in opposite directions and in substantially equal amounts from a predetermined center value corresponding to changes in such an input signal, network means for connecting the output of said energizing means to said control grids, said network means including a gaseous discharge tube serially connected between said energizing means and each of said control grids whereby the voltages from said energizing means are altered by a fixed predetermined magnitude before being applied to said control grids, a load impedance connected to the cathode of one of said electron tubes, and impedance means substantially equal to such load connected to the cathode of the second one of said electron tubes, said load impedance and impedance means being connected in series whereby the common connection therebetween will be at a substantially fixed potential.

7. Electron tube apparatus for supplying power in accordance with an input signal and adapted to use a substantially constant current from a D. C. supply comprising a pair of electron tubes having at least an anode, a cathode and a control grid, each of which is connected in a cathode follower circuit across such a supply, energizing means connected to the control grid of each of said electron tubes for varying the voltages on said grids in opposite directions and in substantially equal amounts from a predetermined center value corresponding to changes in such an input signal, said means including a first differential amplifier having two electron tubes connected in parallel and a common cathode resistor to produce voltages at their anodes of substantially equal but opposite variations corresponding to variations in a voltage applied to the grid of one of said two electron tubes and a second differential amplifier having two electron tubes connected in parallel and a common cathode resistor, the control grids of said two electron tubes being energized directly from the anodes of said two electron tubes of the first differential amplifier, a load impedance connected to the cathode of one of said electron tubes, and variable impedance means connected to the cathode of the second one of said pair of electron tubes and having a value substantially equal to the impedance of said load, said load impedance and impedance means being connected in series whereby the common connection therebetween will be at a substantially fixed potential.

8. Electron tube apparatus for supplying power in accordance with an input signal and adapted to use a substantially constant current from a D. C. supply comprising a pair of electron tubes having at least an anode, a cathode and a control grid, a pair of cathode resistors each of which is connected in series with one of said tubes in a cathode follower circuit across such a supply, energizing means connected to the control grid of each of said electron tubes for varying the voltages on said grids in opposite directions and in substantially equal amounts from a predetermined center value corresponding to changes in such an input signal, a load impedance connected to the cathode of one of said electron tubes, and impedance means connected to the cathode of the second one of said electron tubes and having a value substantially equal to the impedance of said load, said load impedance and impedance means being connected in series between the cathodes of said tubes whereby the common connection therebetween will be at a substantially fixed potential.

References Cited in the file of this patent
UNITED STATES PATENTS

| | | |
|---|---|---|
| 2,226,459 | Bingley | Dec. 24, 1940 |
| 2,240,635 | Avins | May 6, 1941 |
| 2,411,517 | Busignies | Nov. 26, 1946 |
| 2,542,160 | Stoner et al. | Feb. 20, 1951 |
| 2,554,279 | Tharp | May 22, 1951 |
| 2,582,676 | Bordewieck et al. | Jan. 15, 1952 |
| 2,586,804 | Fluke | Feb. 26, 1952 |
| 2,590,104 | King | Mar. 25, 1952 |
| 2,626,321 | Wen Yuan Pan | Jan. 10, 1953 |
| 2,631,200 | Christaldi | Mar. 10, 1953 |
| 2,631,198 | Parisoe | Mar. 10, 1953 |
| 2,676,253 | Ayres | Apr. 20, 1954 |
| 2,684,479 | Hill et al. | July 20, 1954 |